US010118508B2

(12) United States Patent
Bowen et al.

(10) Patent No.: US 10,118,508 B2
(45) Date of Patent: Nov. 6, 2018

(54) MOTOR DRIVEN SLOPED FLOOR RECLINE MECHANISM FOR A THEATER SEAT

(71) Applicant: VIP Cinema LLC, New Albany, MS (US)

(72) Inventors: Jeffrey Bowen, New Albany, MS (US); Terry Dale Johnson, Baldwyn, MS (US); Stephen Simons, New Albany, MS (US)

(73) Assignee: VIP CINEMA, LLC, New Albany, MS (US)

( * ) Notice: Subject to any disclaimer, the term of this patent is extended or adjusted under 35 U.S.C. 154(b) by 339 days.

(21) Appl. No.: 15/155,004

(22) Filed: May 14, 2016

(65) Prior Publication Data
US 2016/0332541 A1 Nov. 17, 2016

Related U.S. Application Data

(60) Provisional application No. 62/161,876, filed on May 14, 2015, provisional application No. 62/162,558, (Continued)

(51) Int. Cl.
*A47C 1/032* (2006.01)
*B60N 2/225* (2006.01)
(Continued)

(52) U.S. Cl.
CPC .......... *B60N 2/2252* (2013.01); *A47C 1/0345* (2013.01); *A47C 1/03211* (2013.01); (Continued)

(58) Field of Classification Search
CPC ... B60N 2/2252; B60N 2/995; A47C 1/03211; A47C 1/0345
(Continued)

(56) References Cited

U.S. PATENT DOCUMENTS 3,394,965 A * 7/1968 Fletcher ............... A47C 1/0355
297/321
3,558,185 A 1/1971 Mizelle
(Continued)

FOREIGN PATENT DOCUMENTS

WO WO2016164281 A1 10/2016

OTHER PUBLICATIONS

International Search Report and Written Opinion, PCT/US2016/032585, dated Aug. 12, 2016.
(Continued)

*Primary Examiner* — Anthony D Barfield
(74) *Attorney, Agent, or Firm* — Winston & Strawn LLP

(57) ABSTRACT

Described is recline mechanism for a comfort seating assembly such as a theater seat which can be mounted on a sloped surface. In a fully recline position, the seating assembly is compact with a layout that falls generally within its profile. The recline mechanism includes a pair of each of: seat rail brackets, front pivot links, rear pivot upper lift link to control the motion of the rear end of the assembly, rear pivot links each attached to one rear pivot upper lift link, carrier links, each carrier link attached to one front pivot link and to a rear pivot link and a pair of rear pivot upper lift control links, attached to a pivot upper lift link and to a carrier link. A linear actuator attached by motor drive tubes at two ends of the linkage system transitions the recline mechanism between the closed and recline positions.

10 Claims, 11 Drawing Sheets

Related U.S. Application Data filed on May 15, 2015, provisional application No. 62/162,607, filed on May 15, 2015.

(51) Int. Cl.
*B60N 2/90* (2018.01)
*A47C 1/034* (2006.01)
*B60N 2/02* (2006.01)

(52) U.S. Cl.
CPC ........ *B60N 2/995* (2018.02); *B60N 2002/024* (2013.01); *B60N 2205/50* (2013.01)

(58) Field of Classification Search
USPC .................................. 297/84, 85 M, 321, 330
See application file for complete search history.

(56) References Cited

U.S. PATENT DOCUMENTS

| | | | |
|---|---|---|---|
| 4,226,473 A * | 10/1980 | Johnson ................ | A47C 1/032 297/321 |
| 5,288,128 A | 2/1994 | Smith et al. | |
| 5,393,120 A | 2/1995 | Woods et al. | |
| 5,823,614 A * | 10/1998 | Johnson ................ | A47C 1/0352 297/84 |
| 6,840,575 B2 | 1/2005 | Hesse | |
| 8,262,163 B2 | 9/2012 | Wu | |
| 8,434,822 B2 | 5/2013 | Asbjornsen | |
| 8,517,463 B2 * | 8/2013 | Murphy ................ | A47C 1/0355 297/84 |
| 8,534,759 B2 | 9/2013 | De La Garza et al. | |
| 2004/0012231 A1 | 1/2004 | Hesse | |
| 2010/0102608 A1 | 4/2010 | Sakamoto | |
| 2010/0171343 A1 | 7/2010 | Asbjornsen | |
| 2011/0127824 A1 | 6/2011 | Wu | |
| 2012/0074751 A1 | 3/2012 | De La Garza et al. | |
| 2012/0286557 A1 | 11/2012 | Hoffman et al. | |

OTHER PUBLICATIONS

International Search Report and Written Opinion, PCT/US2016/032758, dated Aug. 12, 2016.
U.S. Appl. No. 15/155,929, filed May 16, 2016.

\* cited by examiner

POOR STARTING OR ENDING ANGLES ARE COMPENSATED FOR BY HAVING THE ACTUATOR APPLY FORCES IN TWO LOCATIONS ON THE MOVING ASSEMBLY

US 10,118,508 B2

MOTOR DRIVEN SLOPED FLOOR RECLINE MECHANISM FOR A THEATER SEAT

PRIORITY

The present application claims the benefit of priority to U.S. Provisional Application Ser. No. 61/161,876 filed May 14, 2015 and to U.S. Provisional Application Ser. No. 62/162,558 filed May 15, 2015, both titled "MOTOR DRIVEN SLOPED FLOOR RECLINE MECHANISM FOR A THEATER SEAT" and to U.S. Provisional Application Ser. No. 62/162,607 filed May 15, 2015, titled "DUAL MOTION SLOPED FLOOR RECLINE MECHANISM FOR A THEATER SEAT". All said applications are hereby incorporated by reference in their entirety.

BACKGROUND OF THE INVENTION

Field of the Invention

The disclosure relates to a motor driven chair recline mechanism that can be advantageously mounted on sloped floors. More particularly, the disclosure relates to a motor driven recline mechanism for a theater seat.

Background

Theater seats for a movie theater are well known. Typically, the theater seat includes a vertical back member and a seating member operatively connected to the back member, a base frame and a pair of opposed armrests. The back member is fixed relative to the seating member usually by a stanchion secured to the floor of the theater. The seat member and the back member are also connected to the pair of opposed armrests. The seating member, usually pivots relative to the back member, between an upright position when unoccupied and a horizontal position when occupied by a user. Existing recline mechanisms for theater seats are based on designs intended for residential use where space is not an issue. Motorized recline mechanisms are common in residential recliner seats and have only recently become popular as a luxury option in theater venues. Typical residential recliners are not designed to accommodate sloped floors and have essential mechanical components (for example necessary linkage mechanism) that extend down from the seat all the way to floor level and have no capacity for lowering the rear of the recliner as is necessary when mounting on a non-leveled or sloped floor. In addition, utilizing all the space under a seat for essential mechanical components makes cleaning under the recliner a difficult or impossible task. In movie theaters, for example, there is a code requiring a minimum clearance between rows in a theater that must be adhered to. Such a code limits the type of recline-type seats that can be used, the quantitative layout allowed for per seat, and, therefore, the number of seats that can be installed in a given space. There is a need for a seat assembly that provides the comfort of the recline aspect of a VIP chair but at the same time be compact from front to rear, with a small layout when the chair is open that falls generally within its own profile.

SUMMARY OF THE INVENTION

The current disclosure provides a recline mechanism and its associated compact and comfort seat assembly that allows its mounting on leveled and on sloped floors. The seat assembly, can be for example, a theater seat. Alternatively the seat assembly may be an airplane seat, a bus seat, a train seat or a boat seat, etc.

It is an objective of the current disclosure to provide a recline mechanism for a seating assembly having, a pair of seat rail brackets (10); a pair of front pivot links (9), each link of said pair of front pivot links attached to one bracket of said pair of seat rail bracket (10); a pair of rear pivot upper lift link (13) configured to control the motion of a rear end of the seating assembly wherein each link of said pair of rear pivot upper lift links (13) is attached at its upper end to one bracket of said pair of seat rail brackets (10); a pair of rear pivot links (15) each link attached at its upper end to the lower end of one link of said pair of rear pivot upper lift links (13); a pair of carrier links (12), each of said carrier links attached to one link of said pair of front pivot links (9) and to the lower end of one link of said pair of rear pivot links (15); and a pair of rear pivot upper lift control links (14), each link of said rear pivot upper lift control link attached at its upper end to one link of said pair of pivot upper lift links (13) and at its lower end to one link of said pair of carrier links (12). The recline mechanism can further include a linear actuator (30), a front motor drive tube (11a), and a rear motor drive tube (11b), wherein the front motor drive tube is attached to each of said pair of front pivot links (9) and the back motor drive tube is attached to the pair of rear pivot links (15), and wherein said linear actuator (30) is attached to said front motor drive tube (11b) by the front actuator attachment point (24) and to said rear motor drive (11b) by the rear actuator attachment point (26).

It is a further object of the current invention to provide a seating assembly having a recline mechanism that includes a pair of seat rail brackets (10); a pair of front pivot links (9), each of said pair of front pivot links attached to one of sais pair of seat rail bracket (10) on opposite sides; a pair of rear pivot upper lift link (13) configured to control the motion of a rear end of the seating assembly wherein each of said pair of rear pivot upper lift links (13) is attached at its upper end to one of said pair of seat rail brackets (10); a pair of rear pivot links (15) each attached at its upper end to the lower end of one of said pair of rear pivot upper lift links (13); a pair of carrier links (12), each of said carrier links attached to one of said pair of front pivot links (9) and to the lower end of one of said pair of rear pivot links (15); and a pair of rear pivot upper lift control links (14), each of said rear pivot upper lift control link attached at its upper end to one of said pivot upper lift link (13) and at its lower end to one of said carrier link (12). The seating assembly can further include a linear actuator (30), a front motor drive tube (11a), and a rear motor drive tube (11b), wherein the front motor drive tube is attached to each of said pair of front pivot links (9) and the back motor drive tube is attached to the pair of rear pivot links (15), and wherein said linear actuator (30) is attached to said front motor drive tube (11lb) by the front actuator attachment point (24) and to said rear motor drive (11b) by the rear actuator attachment point (26). The seating assembly may be a theater seat, an airplane seat, a bus seat, a train seat or a boat seat. The seating assembly may be mounted on a sloped surface or on a leveled or flat surface.

It is also an objective of the current disclosure to provide a recline mechanism for a seating assembly having, a pair of seat rail brackets (10); a pair of front pivot links (9), each of said pair of front pivot links attached to one of sais pair of seat rail bracket (10) on opposite sides; a pair of rear pivot upper lift link (13) configured to control the motion of a rear end of the seating assembly wherein each of said pair of rear pivot upper lift links (13) is attached at its upper end to one of said pair of seat rail brackets (10); a pair of rear pivot links (15) each attached at its upper end to the lower end of one of said pair of rear pivot upper lift links (13); a pair of carrier links (12), each of said carrier links attached to one of said pair of front pivot links (9) and to the lower end of one of said pair of rear pivot links (15); and a pair of rear pivot upper lift control links (14), each of said rear pivot upper lift control link attached at its upper end to one of said pivot upper lift link (13) and at its lower end to one of said carrier link (12). The recline mechanism can further include a linear actuator (30), a front motor drive tube (11a), and a rear motor drive tube (11b), wherein the front motor drive tube is attached to each of said pair of front pivot links (9) and the back motor drive tube is attached to the pair of rear pivot links (15), and wherein said linear actuator (30) is attached to said front motor drive tube (11b) by the front actuator attachment point (24) and to said rear motor drive (11b) by the rear actuator attachment point (26) and also further includes a seat frame assembly (55) connected to the seat rail bracket (10), a back frame assembly (50) connected to the seat frame assembly (55). The recline mechanism may be part of a seating assembly that also includes an Ottoman assembly (60, 65) so as to provide a foot rest to the user of the seat assembly such that the Ottoman assembly is attached to the seat frame by links via pivotal connection points.

An additional objective of the invention is to provide recline mechanism for a seating assembly having, a pair of seat rail brackets (10); a pair of front pivot links (9), each of said pair of front pivot links attached to one of sais pair of seat rail bracket (10) on opposite sides; a pair of rear pivot upper lift link (13) configured to control the motion of a rear end of the seating assembly wherein each of said pair of rear pivot upper lift links (13) is attached at its upper end to one of said pair of seat rail brackets (10); a pair of rear pivot links (15) each attached at its upper end to the lower end of one of said pair of rear pivot upper lift links (13); a pair of carrier links (12), each of said carrier links attached to one of said pair of front pivot links (9) and to the lower end of one of said pair of rear pivot links (15); and a pair of rear pivot upper lift control links (14), each of said rear pivot upper lift control link attached at its upper end to one of said pivot upper lift link (13) and at its lower end to one of said carrier link (12); and a linear actuator (30), a front motor drive tube (11a), and a rear motor drive tube (11b), wherein the front motor drive tube is attached to each of said pair of front pivot links (9) and the back motor drive tube is attached to the pair of rear pivot links (15), and wherein said linear actuator (30) is attached to said front motor drive tube (11b) by the front actuator attachment point (24) and to said rear motor drive (11b) by the rear actuator attachment point (26), such that the linear actuator is configured to move at both ends. A seating assembly having this recline mechanism including the linear actuator is also an objective of the current invention.

It is an objective of this invention to also provide for a seating assembly a recline mechanism including a linear actuator assembly including a motor that is attached to a motor drive tube (11) at one end where the motor drive tube (11) is rigidly attached at the lower end to the rear pivot link (9) and at the other end to a second motor drive tube (11) which is rigidly attached to the rear pivot link (15), and such that the linear actuator is configured to move at both ends. The linear actuator provided by the current disclosure, is not rigidly fixed to the carrier link (or base) at one end, but is allowed to move at both ends, a configuration that allows the motor to more efficiently articulate the seating assembly by avoiding loses due to poor angular position of the driving forces.

BRIEF DESCRIPTION OF THE DRAWINGS

It being understood that the figures presented herein should not be deemed to limit or define the subject matter claimed herein, the applicants' invention may be understood by reference to the following description taken in conjunction with the accompanying drawings, in which:

FIG. 1 also depicts the clearance allowed by the recline mechanism for sloped floor.

FIG. 3 also illustrates the front and rear pivot links, the front and rear actuator attachment points, the front and rear lever (fulcrum) fixed to the base and the carrier or fixed base link.

DESCRIPTION OF ILLUSTRATIVE EMBODIMENTS

Figure 1:
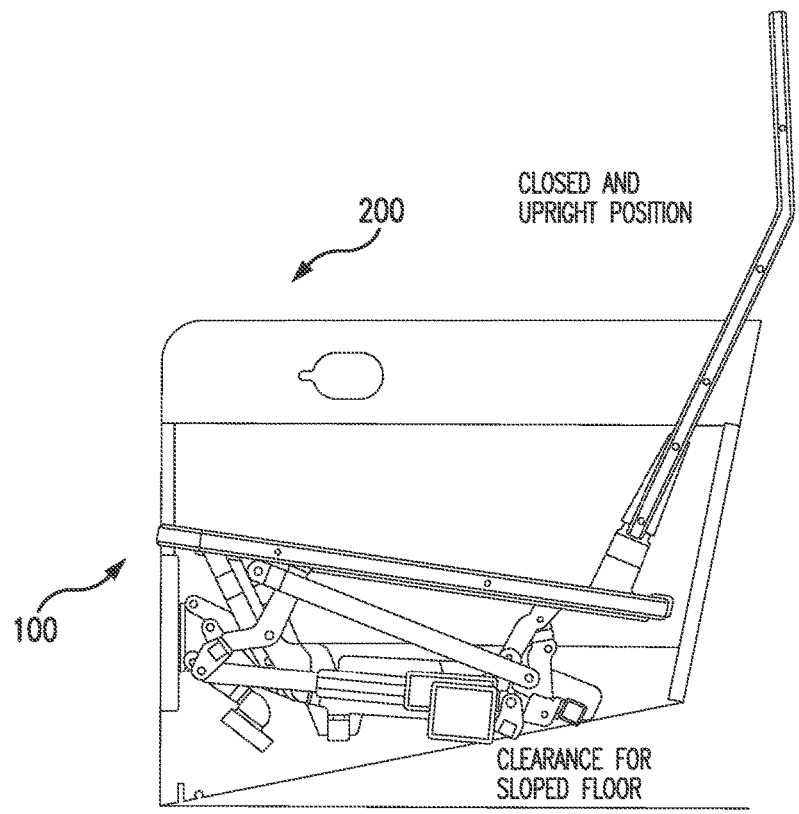
FIG. 1 depicts a side view of a seat with a recline mechanism in accordance with the current invention wherein the back member is in the closed and upright position.

Illustrative embodiments of the invention are described below. In the interest of clarity, not all features of an actual implementation are described in this specification. The following detailed description of exemplary embodiments, read in conjunction with the accompanying drawings, is merely illustrative and is not to be taken as limiting the scope of the invention. Rather, the scope of the invention is defined by the appended claims and equivalents thereof. It will of course be appreciated that in the development of an actual embodiment, numerous implementation-specific decisions must be made to achieve the design-specific goals, which will vary from one implementation to another. Moreover, it will be appreciated that such a development effort, while possibly complex and time-consuming, would nevertheless be a routine undertaking for persons of ordinary skill in the art having the benefit of this disclosure. Further aspects and advantages of the various embodiments of the invention will become apparent from consideration of the following description and drawings. It is noted, however, that the figures are not necessarily drawn to scale.

The current disclosure provides a recline mechanism 100 and a seating assembly 200 including the recline mechanism 100 as depicted in FIGS. 1-17. Seating assembly is compact from front to rear, has a limited layout when the chair is open that falls within the seating assembly's own profile. In one embodiment, the seating assembly is a theater seat. However, the recline mechanism of the current invention is not limited to theater seats, but can also be used in connection with a train seat, a bus seat, a boat seat, an airplane seat, etc. The current disclosure also provides a recline linkage mechanism suitable for use in seating assemblies anchored on flat/leveled or on sloped floors of varying degrees. The recline mechanism may be driven by a linear actuator or motor that is attached at both ends to a moving linkage, wherein the links move together in unison to operate the seating assembly. The motor driven recline mechanism of the current invention is particularly advantageous because a useable force is applied at two different locations in the linkage system so that when the links are in an inefficient position at one end, the links at the other end compensates. This aspect is different from prior art recline mechanisms and seating assemblies which are designed such that the linear actuator/motor is anchored to a stationary point at one end only. With the current mechanism, both front and rear pivot links are effectively being controlled. The current invention is not limited to use a motor but any linear actuator including a gas cylinder, a spring, etc. may be used with the recline mechanism of the current invention.

The recline mechanism according to the current invention is unique in several aspects. The compactness of the rear of the linkage allows the mechanism to be used on a sloped floor application. In addition, the use of a linear actuator as contemplated in the design of the current recline mechanism allow for infinitely adjustable control between the closed position and reclined position. In addition, the linear actuator can be attached to moving linkage at both ends to make full use of the motor stroke and compensates for changing angular forces.

Figure 2:
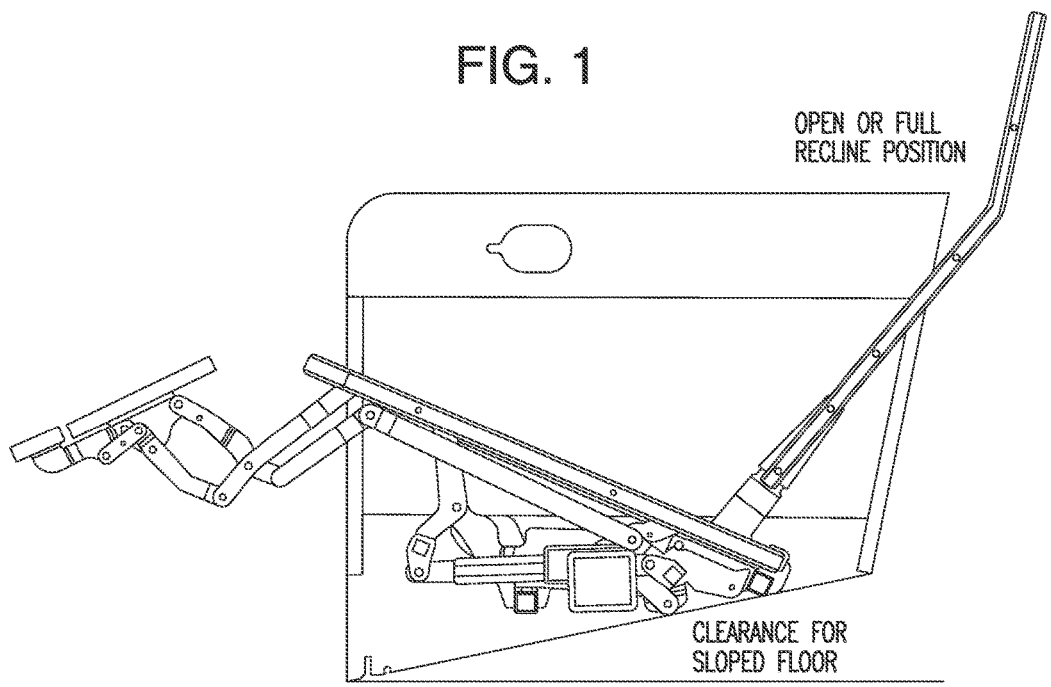
FIG. 2 shows a side view of a seating assembly with the recline mechanism of FIG. 1 such that the back member of the seating assembly is in the open or full recline position and the foot rest extended. Also depicted in FIG. 2 is the clearance allowed for by the recline mechanism while in function on a sloped floor.
Figure 7:
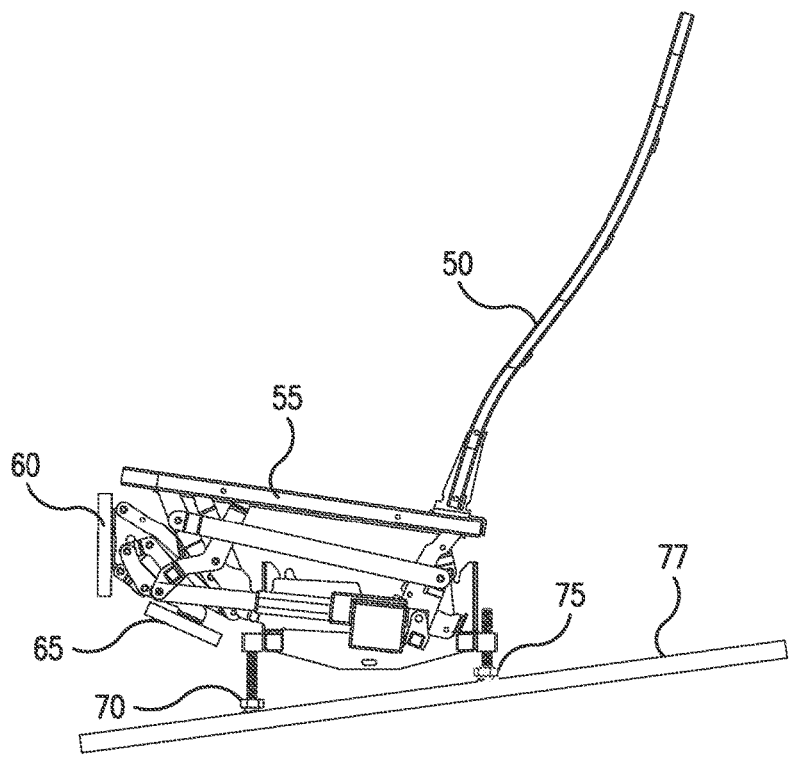
FIG. 7 depicts a recline mechanism fitted on a sloped floor with the back frame in the upright position.
Figure 8:
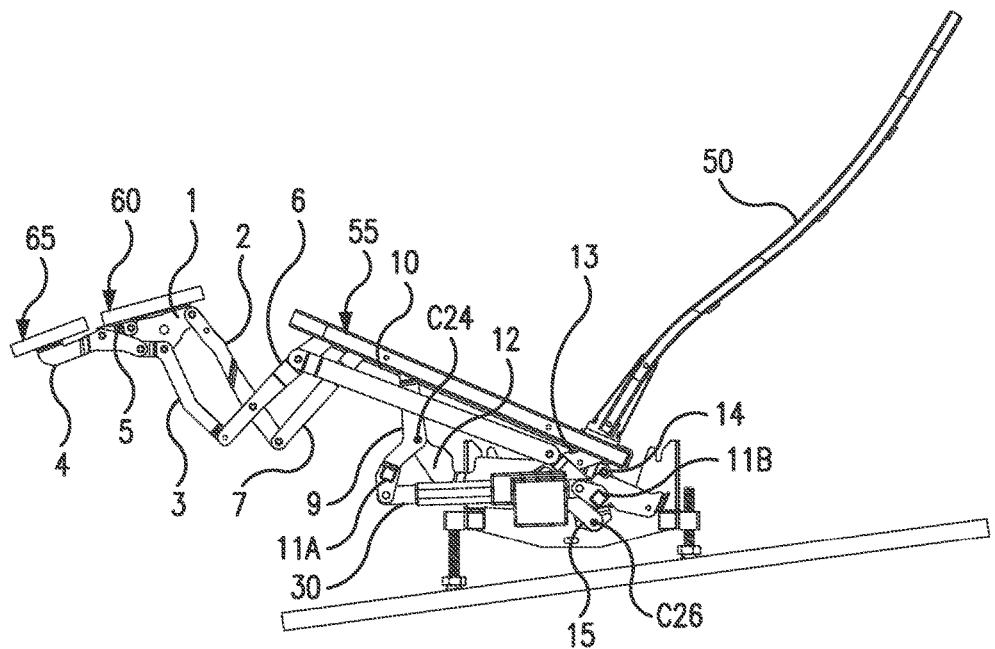
FIG. 8 illustrates the recline mechanism of FIG. 7 in the extended full recline configuration.
Figure 11:
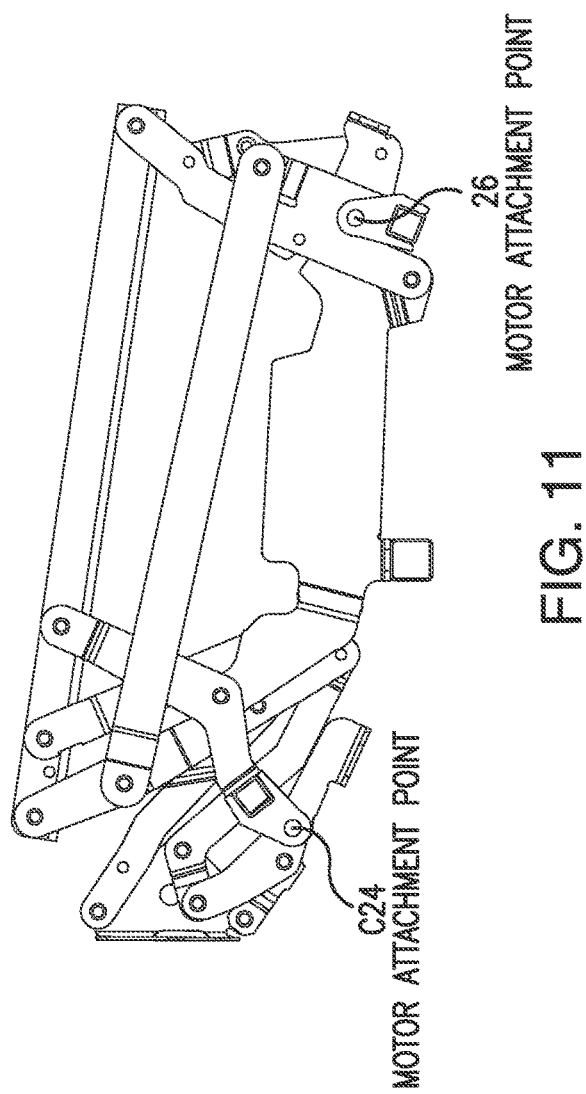
FIG. 11 is an illustration of a recline mechanism of the current invention as shown in FIG. 9 depicting the actuator/motor attachment points.
Figure 12:
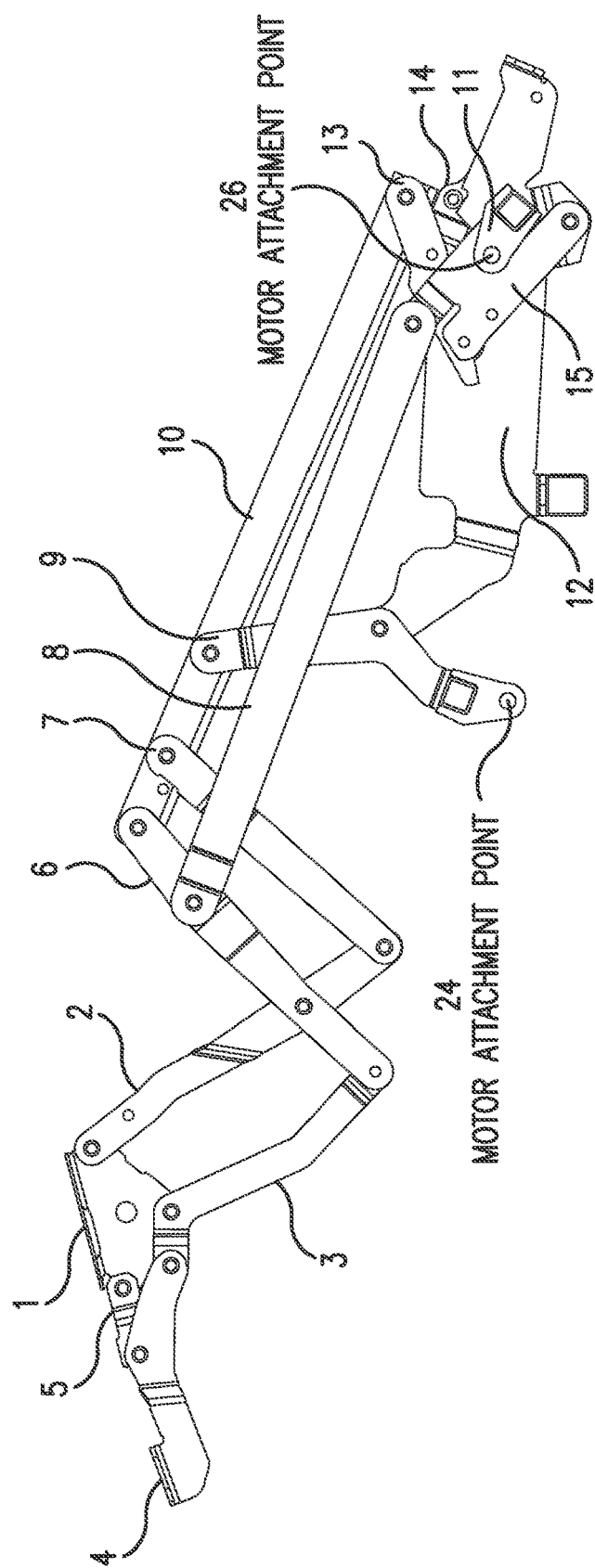
FIG. 12 is an illustration of a linkage mechanism of FIG. 11 in the extended configuration.
Figure 13:
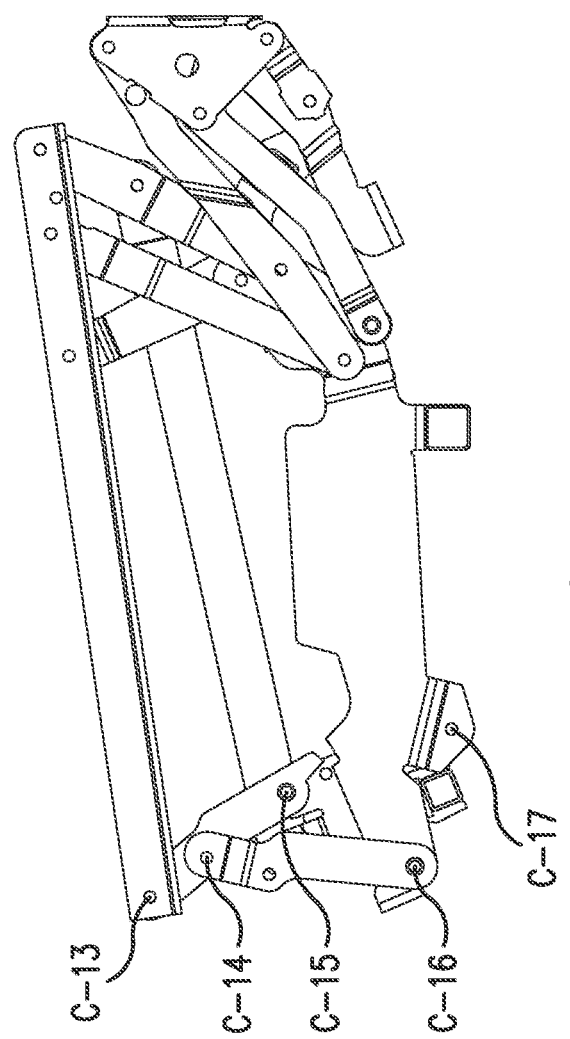
FIG. 13 is an illustration of the opposite side of the linkage mechanism of FIG. 11.
Figure 14:
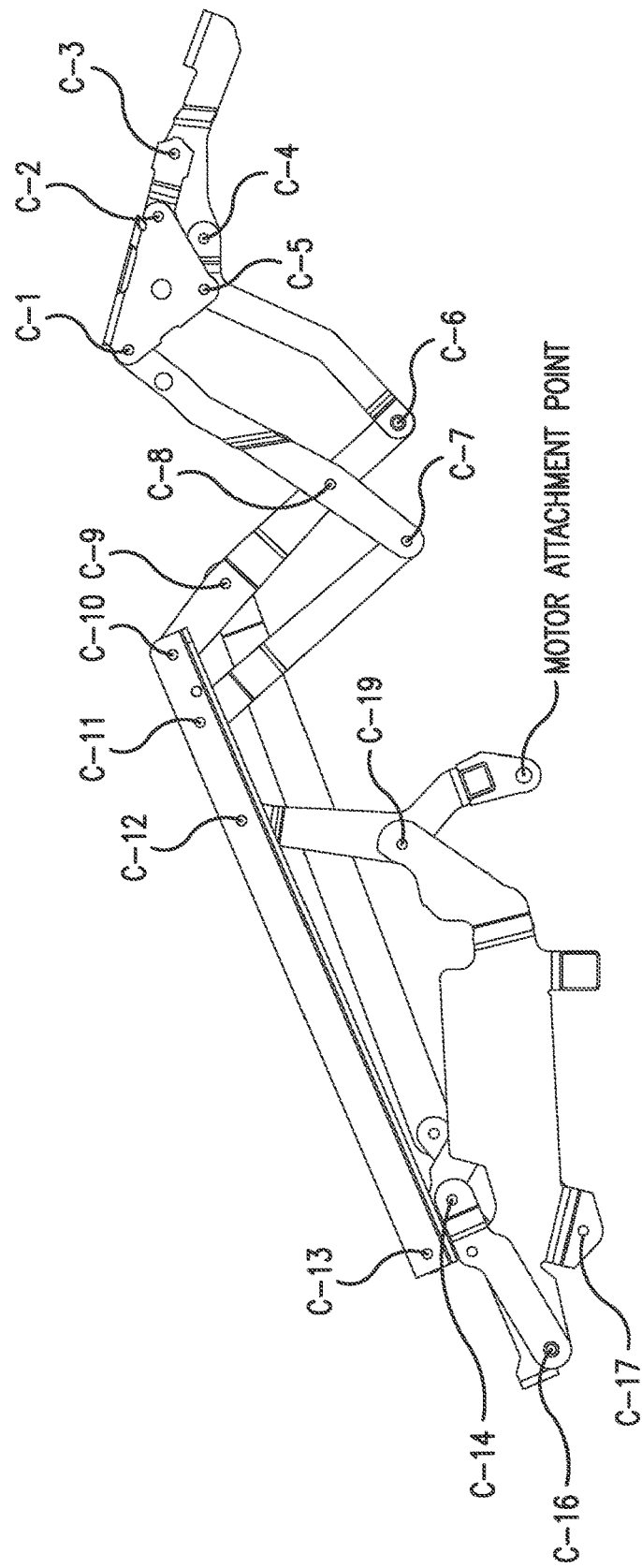
FIG. 14 is an illustration of the linkage mechanism of FIG. 13 in the extended configuration.

The recline mechanism 100 affords the seating assembly various configurations: 1—normal unoccupied position, in which the seating member is in an upright position and the back member is in the upright position as shown in FIGS. 1, 7 and 11; 2—occupied position, in which the seating member is in a down/closed position and the back member is in a full recline position as shown in FIGS. 2, 8 and 12.

In reference to FIGS. 1-16, an embodiment of the motor driven sloped floor recline mechanism 100 of the current invention is used in connection with a seating assembly 200 comprising a seating member or seat frame 55; a pair of side panels or side arms on opposite sides of the seating member (not shown), a back member or back frame 50 disposed between and operatively connected to the side arms/panels. The seating member 55 can be in a closed and upright position or in a seat-down occupied position. The back member 50 is configured to operate in a closed upright position as shown in FIGS. 1 and 7 or in an open full recline position as shown in FIGS. 2 and 8.

FIG. 1 shows a recline mechanism within seating assembly 200 in the closed and open positions and the clearance gained for use on sloped floors. FIG. 2 demonstrates the recline mechanism in function while allowing clearance for sloped floor use.

Figure 3:
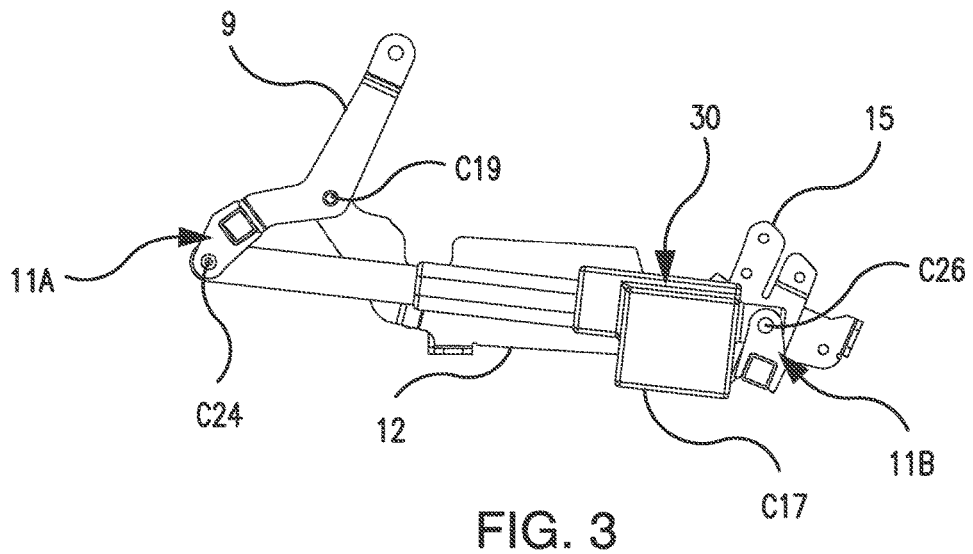
FIG. 3 illustrates the linkage system of the recline mechanism in the closed and upright position.
Figure 4:
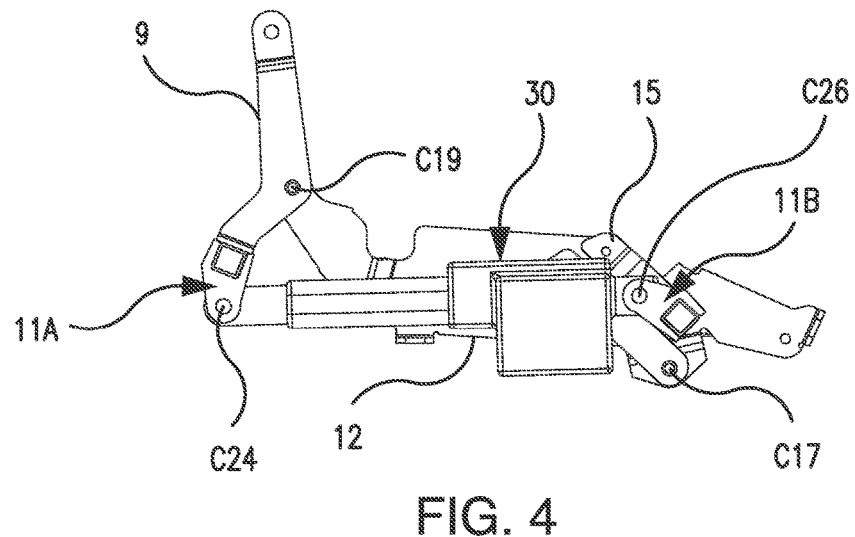
FIG. 4 illustrates the mechanism of FIG. 3 in an open or full recline position.

FIG. 3 illustrates the linkage system of the recline mechanism in the closed and upright position. As shown, front pivot link 9 attaches to carrier link 12 via connection point C19. Rear pivot link (15) is connected to carrier link (12) via connection point C17. Linear actuator 30 is attached to front motor drive tube (11*a*) at one end via connection point C24 and at the other end the linear actuator (30) is attached to a second motor drive tube (11*b*) via connection point C26 (also shown in FIG. 17). Front lever (Fulcrum) 20 is a pivotal connection connecting front pivot link 9 to carrier link 12 and rear lever (Fulcrum) 22 is a pivotal connection point between rear pivot link 15 and carrier link 12, as described in Table 1. FIG. 4 illustrates the same recline mechanism of FIG. 3 but in an open or full recline position.

Figure 5:
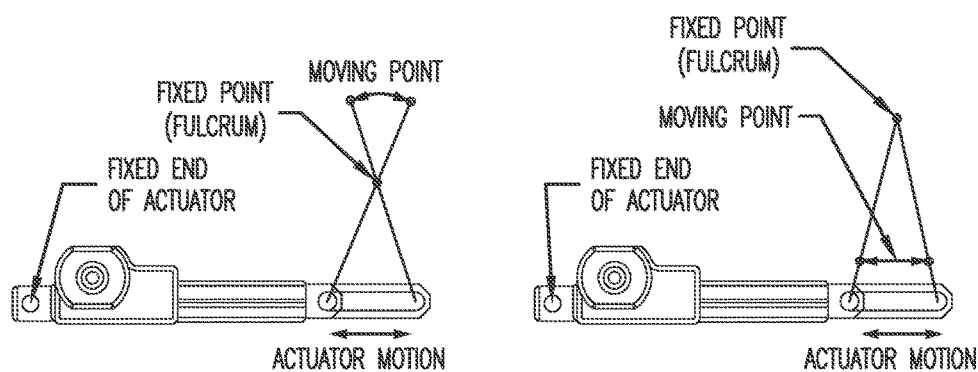
FIG. 5 illustrates examples of a fixed end actuator as used in prior art mechanisms.
Figure 6:
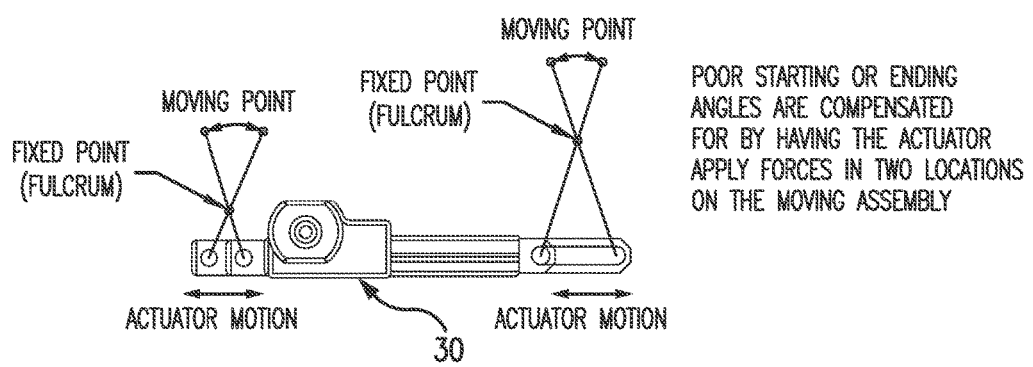
FIG. 6 illustrates a floating end actuator and its motion in accordance with the current invention. The actuator applies forces in two shown locations on the moving assembly.

The recline mechanism, according to the current invention, includes a floating end actuator 30 as shown in FIGS. 3, 4, 6 and 17. Having a floating end, as opposed to a fixed end actuator/motor as in prior art mechanisms, has a major advantage in the way it compensates for poor starting or ending angles. A floating actuator 30, according to the current invention, applies forces in two locations on the moving recline assembly/mechanism thereby decreasing chances of failure. Such a floating design, as illustrated in FIG. 6, allows actuator 30 to more efficiently articulate the seating assembly or chair by avoiding losses due to the angular position of the driving forces. This way, actuator 30 has a mechanical advantage and is not subject to loads due to poor leverage. FIG. 5 illustrates prior art design encompassing a fixed end actuator.

Referring to FIGS. 1-4, operation of the motor driven sloped floor recline mechanism will now be described. The connection and arrangement of the mechanism linkage side assemblies, linear actuator, motor drive tubes, fixed base, seat frame, and back frame, as described above, enable the occupant to adjust the position of the seat frame, back frame and, as in one embodiment, the ottoman section.

Starting from the closed position as in FIG. 1, the linear actuator 30 would be in the fully extended position which pushes the connection points (C24 and C26) to their furthest distance apart. Activation of the linear actuator 30 shortens the effective distance between the connection points (C24 and C26) which in turn controls the rotation of the front pivot link 9 which pulls the front section of seat rail bracket 10 forward. Concurrently, the position of connection points (C24 and C26) controls the rotation of the rear pivot link 15. Rear pivot link 15, rear pivot upper lift link 13, and rear pivot upper lift control link 14 rotate to a vertically shorter height and in turn pull the rear of the seat rail bracket 10 forward and down toward the full recline position.

FIGS. 7 and 8 illustrate the different components of the recline mechanism of the current invention and its linkage system when the seating assembly/chair is in a closed or in an open/fully reclined configuration. The seating assembly may be mounted on a sloped floor or on a flat floor by adjustable legs or by bolts, clamp-type linkage supports or simple threaded legs. The components include, in an operational connection, as shown in FIGS. 7 and 8, a back frame assembly 50, attached to a seat frame assembly 55, and an optional Ottoman assembly 300. In some embodiments, the seating member assembly 55 and the back member assembly 50 may be rigidly attached to each other. The use of further linkage to allow the back member to articulate in relation to the seating member is also contemplated. Seat frame assembly 55 is rigidly attached to a pair of seat rail brackets 10 one on the left side of the seat and one on the right. Front adjustable leg 70 and rear adjustable leg 75 are attached to fixed base 28 which is rigidly attached to carrier link 12 Adjustable leg 70 and adjustable leg 75 are secured to sloped floor 77. Several types of adjustable legs can be used in connection with the linkage mechanism of the current disclosure including bolt on, clamp type, linkage supports and simple threaded legs.

Figure 9:
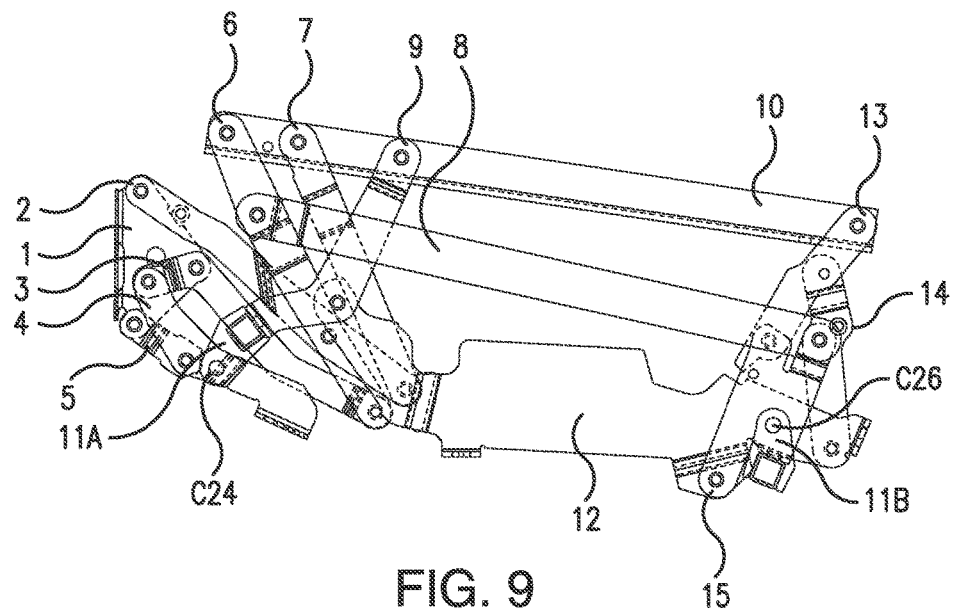
FIG. 9 is an illustration of the different components of the linkage mechanism.
Figure 10:
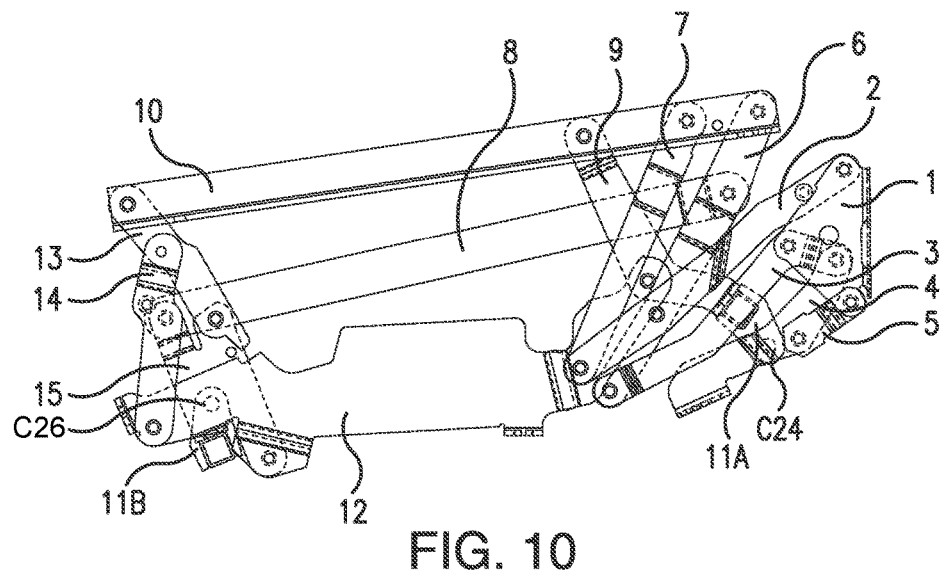
FIG. 10 is a view of the opposite side of the linkage mechanism shown in FIG. 9.

The seating assembly 200 may further include a foot rest or a main Ottoman assembly 300, as shown in FIGS. 7-9. Ottoman assembly 300 includes in functional operation, main ottoman board 60, flipper ottoman board 65, front adjustable leg 70 and back adjustable legs 77, footrest bracket 1, ottoman link numbers 2, 3, 6, 7, flipper ottoman link 4, flipper ottoman control link 5, ottoman drive link 8. Ottoman board 60 attached on both sides to footrest bracket (1) is operatively connected to the seat rail bracket (10) (shown in FIGS. 1, 2, 7 and 8). Flipper Ottoman board 65 is attached to Flipper Ottoman Link 4. Seat frame 55 is attached to Ottoman assembly 300 by Ottoman link three and Ottoman link four, (reference numbers 6 and 7 respectively) which are attached to Ottoman links one and Ottoman link two (reference numbers 2 and 3) by foot rest bracket 1 and flipper Ottoman link 4 respectively. With the linkage system described and shown in FIG. 8, the Ottoman assembly/foot rest is configured to optionally extend outwards and upwards from the seat or fold under the seat member according to a user preference.

Figure 15:
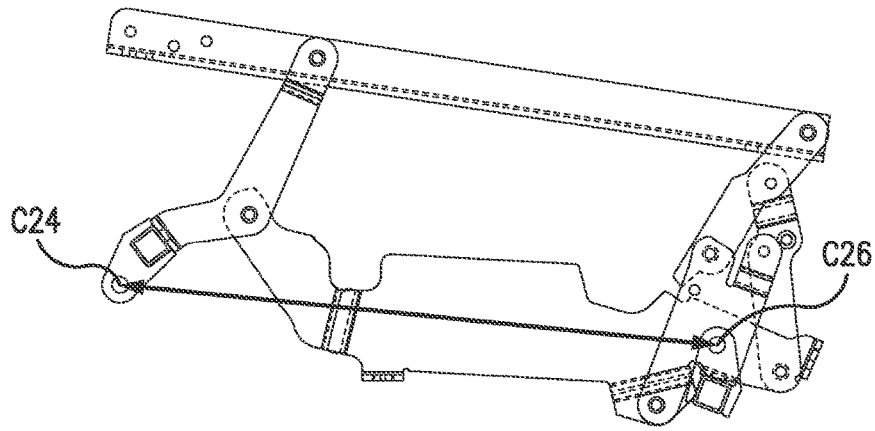
FIG. 15 is an illustration depicting motor attachment points and the direction of forces pushing the two attachment points apart when the seat assembly is in the upright position.
Figure 16:
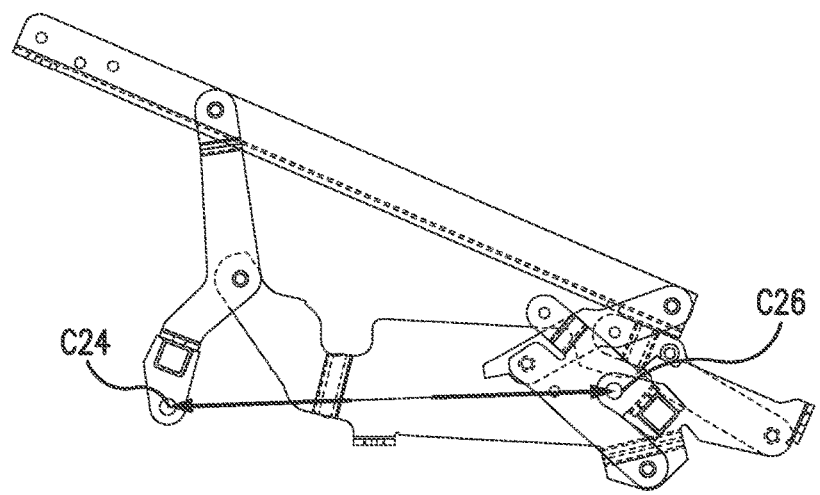
FIG. 16 is an illustration depicting linear actuator attachment points and the direction of force pushing the two points towards each other in the recline configuration.
Figure 17:
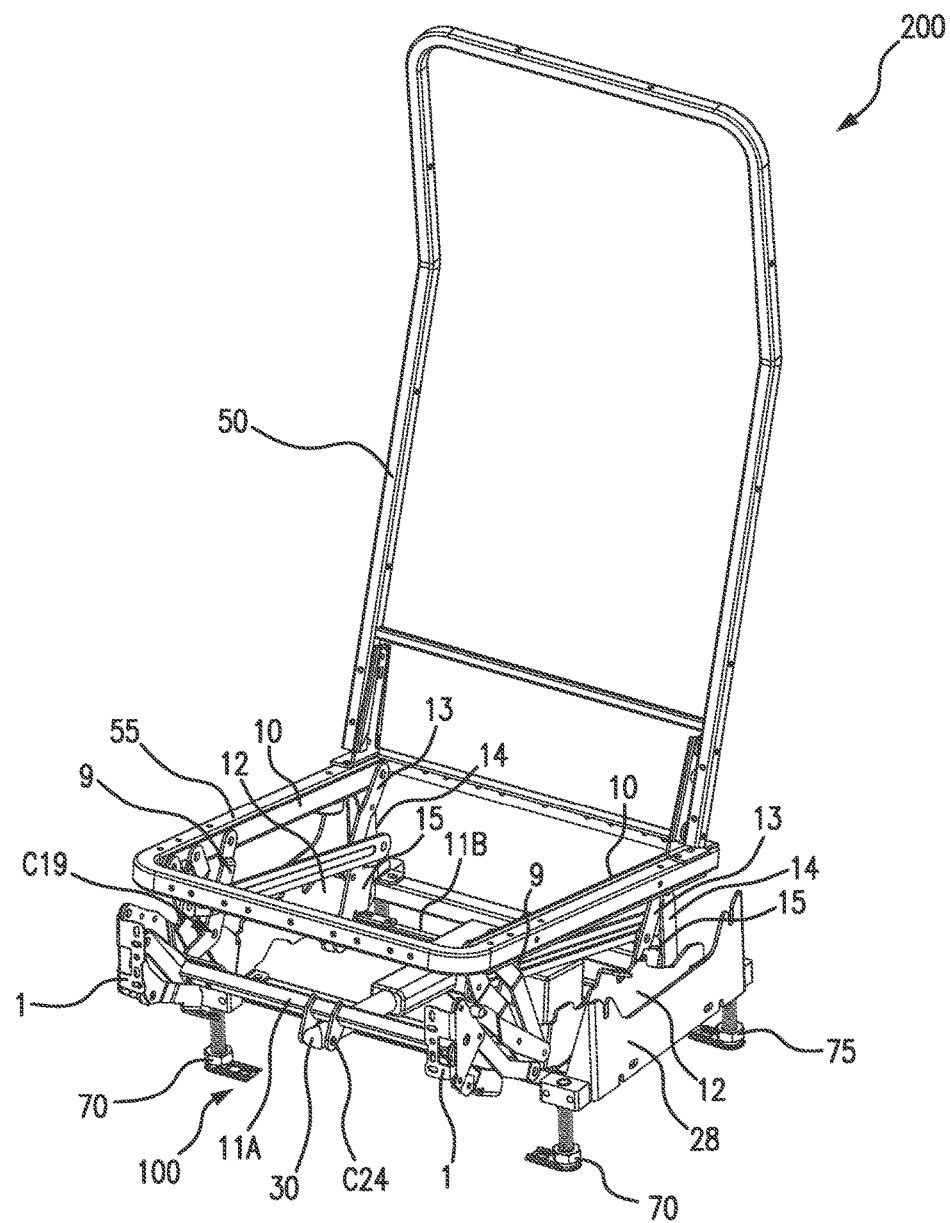
FIG. 17 is an illustration of an embodiment of the current invention showing an isometric view of the seating assembly and its recline mechanism having a right side and a left side and also having with a linear actuator/motor attached by a front motor tube and a back motor tube in the center of the recline mechanism.

FIGS. 9-17 illustrate the different components of the recline mechanism of the current invention and its linkage system in various configurations. The recline mechanism shown in FIG. 9 includes front pivot link 9, seat rail bracket 10, motor drive tube assembly 11, carrier link (or fixed base link) 12, rear pivot upper lift link 13, rear pivot upper lift control link 14 and rear pivot link 15. Seat rail bracket 10 is attached to rear pivot upper lift link 13 which controls the motion of the rear of the seat. Rear pivot upper lift link 13 is attached at the lower end to the upper end of rear pivot link 15, and the latter is connected at its other end to carrier link 12. The rear pivot upper lift control link 14 is connected to rear pivot upper lift link 13 and at the lower end to carrier link 12. This contrasts with many existing known mechanisms which are metal-to-the-floor type with a traditional linear actuator drive. To gain the vertical compactness necessary to use a mechanism on a sloped floor, the single link rear pivot of prior art recliner mechanisms are replaced with an arrangement of links that act to control the rear of the seat. This allows the vertical height to be more compact in the open or recline position and concurrently provides the clearance necessary to mount the seat assembly on a sloped floor. As discussed supra, the seating assembly of the current invention also includes a motor drive tube 11 comprising a floating end motor/actuator 30 that is attached to moving linkage at both ends so as to make full use of the motor stroke and compensate for changing angular forces. Beginning with the linear actuator 30, the two ends of the linear actuator are connected to the motor drive tubes 11A and 11B, as shown in FIG. 17, by pivotal connection C24 and C26. Front motor drive tube 11A is rigidly attached to the lower end of front pivot link 9 and rear motor drive tube 11B is rigidly attached to rear pivot link 15. This linear actuator connection to front and rear pivot links via motor drives 11A and 11 B is the controlling or driving force that transitions the linkage system between the closed and recline positions.

The various components of the recline mechanism shown in FIGS. 9-17 are interconnected by various pivotal connections as shown below in Table 1.

TABLE 1

| CONNECTION NUMBER | DESCRIPTION |
|---|---|
| C1 | PIVOTAL CONNECTION BETWEEN FOOTREST BRACKET (1) AND OTTOMAN LINK NUMBER 1 (2) |
| C2 | PIVOTAL CONNECTION BETWEEN FOOTREST BRACKET (1) AND FLIPPER OTT. CONTROL LINK (5) |
| C3 | PIVOTAL CONNECTION BETWEEN FLIPPER OTT. CONTROL LINK (5) AND FLIPPER OTTOMAN LINK (4) |
| C4 | PIVOTAL CONNECTION BETWEEN FLIPPER OTTOMAN LINK (4) AND OTTOMAN LINK NUMBER 2 (3) |
| C5 | PIVOTAL CONNECTION BETWEEN OTTOMAN LINK NUMBER 2 (3) AND FOOTREST BRACKET (1) |
| C6 | PIVOTAL CONNECTION BETWEEN OTTOMAN LINK NUMBER 2 (3) AND OTTOMAN LINK NUMBER 3 (6) |
| C7 | PIVOTAL CONNECTION BETWEEN OTTOMAN LINK NUMBER 1 (2) AND OTTOMAN LINK NUMBER 4 (7) |
| C8 | PIVOTAL CONNECTION BETWEEN OTTOMAN LINK NUMBER 1 (2) AND OTTOMAN LINK NUMBER 3 (6) |
| C9 | PIVOTAL CONNECTION BETWEEN OTTOMAN LINK NUMBER 3 (6) AND OTTOMAN DRIVE LINK (8) |
| C10 | PIVOTAL CONNECTION BETWEEN OTTOMAN LINK NUMBER 3 (6) AND SEAT RAIL BRACKET (10) |
| C11 | PIVOTAL CONNECTION BETWEEN OTTOMAN LINK NUMBER 4 (7) AND SEAT RAIL BRACKET (10) |
| C12 | PIVOTAL CONNECTION BETWEEN SEAT RAIL BRACKET (10) AND FRONT PIVOT LINK (9) |
| C13 | PIVOTAL CONNECTION BETWEEN SEAT RAIL BRACKET (10) AND REAR PIVOT UPPER LIFT LINK (13) |
| C14 | PIVOTAL CONNECTION BETWEEN REAR PIVOT UPPER LIFT LINK (13) AND REAR PIVOT UPPER LIFT CONTROL LINK (14) |

TABLE 1-continued

| CONNECTION NUMBER | DESCRIPTION |
|---|---|
| C15 | PIVOTAL CONNECTION BETWEEN REAR PIVOT UPPER LIFT LINK (13) AND REAR PIVOT LINK (15) |
| C16 | PIVOTAL CONNECTION BETWEEN REAR PIVOT UPPER LIFT CONTROL LINK (14) AND CARRIER LINK (12) |
| C17 (or 22) | PIVOTAL CONNECTION BETWEEN REAR PIVOT LINK (15) AND CARRIER LINK (12) |
| C18 | PIVOTAL CONNECTION BETWEEN REAR PIVOT LINK (15) AND OTTOMAN DRIVE LINK (8) |
| C19 (or 20) | PIVOTAL CONNECTION BETWEEN CARRIER LINK (12) AND FRONT PIVOT LINK (9) |
| C24 | FRONT ACTUATOR ATTACHMENT POINT |
| C26 | REAR ACTUATOR ATTACHMENT POINT |

FIG. 15 is an illustration depicting motor front actuator attachment point C24 and rear actuator attachment point C26. Linear actuator 30 forces the two points apart leading to the rotation of front pivot link 9 to an upright position and to the rotation of rear pivot link arrangement (rear pivot upper lift link 13, rear pivot upper lift control link 14 and rear pivot link 15) into upright position The rear pivot link arrangement is integral to the compactness of the mechanism. The use of a collapsing linkage in the rear allows for the use of this mechanism on a sloped floor.

FIG. 16 is an illustration also depicting motor attachment points C24 and C26 and the result of the motor forcing C24 and C26 towards each other leading to the rotation of front pivot link 9 forward and pulling the rear pivot link arrangement (rear pivot upper lift link 13, rear pivot upper lift control link 14 and rear pivot link 15) into the collapsed or recline position/configuration. FIGS. 15 and 16 illustrate how the linear actuator pushes and pulls on rear pivot link 15 at point C26 and concurrently front pivot link (9) at point C24, thereby activating all the linkage that is necessary to allow the seating assembly to transition between the closed and open positions.

FIG. 17 shows an isometric view of seating assembly 200 and its recline mechanism 100 having a right side and a left side that are connected laterally by two motor drive tubes (11A and 11B) which act to synchronize both the right and left mechanism side assemblies and activate the side assembly linkage. Both right and left sides have similar links and connections as necessitated to have a symmetrically and operationally functional mechanism as would be well understood by a person of skill in the art. Motor drive tubes (11A and 11B) are rigidly attached to front pivot link 9 and rear pivot link 15. Linear actuator 30 is attached to motor drive tubes along a center line running in the assembly from front to back by connection points C24 and C26. Typical prior art utilizes only one moving point to drive the mechanism through its motion. The other end of the motor/actuator is connected to a non-moving portion of the mechanism.

It will be understood by one of ordinary skill in the art that in general any subset or all of the various embodiments and inventive features described herein may be combined, notwithstanding the fact that the claims set forth only a limited number of such combinations. Table 2 lists various parts of the recline mechanism of the current invention.

TABLE 2

List of various parts of the recline mechanism of the current invention or associated elements

| Item No. | Description | FIG. |
|---|---|---|
| 1 | Footrest Bracket | FIG. 8 and 12 |
| 2 | Ottoman Link Number 1 | FIG. 8 and 12 |
| 3 | Ottoman Link Number 2 | FIG. 8 and 12 |
| 4 | Flipper Ottoman Link | FIG. 8 and 12 |
| 5 | Flipper Ottoman Control Link | FIG. 8 and 12 |
| 6 | Ottoman Link Number 3 | FIG. 8 and 12 |
| 7 | Ottoman Link Number 4 | FIG. 8 and 12 |
| 8 | Ottoman Drive Link | FIG. 8 and 12 |
| 9 | Front Pivot Link | FIG. 3 and 4 |
| 10 | Seat Rail Bracket | FIG. 8 and 12 |
| 11 | Motor Drive Tube | FIG. 17 |
| 12 | Carrier Link (Fixed Base Link) | FIG. 3 and 4 |
| 13 | Rear Pivot Upper Lift Link | FIG. 8 and 12 |
| 14 | Rear Pivot Upper Lift Control Link | FIG. 8 and 12 |
| 15 | Rear Pivot Link | FIG. 3 and 4 |
| 18 | Chassis plate = | |
| 20 (C19) | Front lever (Fulcrum) fixed to base | FIG. 3 and 4 |
| 22 (C17) | Rear Lever (Fulcrum) fixed to base | FIG. 3 and 4 |
| 24 (C24) | Front Actuator Attachment Point | FIG. 3 and 4 |
| 26 (C26) | Rear Actuator Attachment Point | FIG. 3 and 4 |
| 28 | Fixed base | |
| 30 | Linear Actuator | FIGS. 3, 4, 5 and 6 |
| 50 | Back frame assembly | FIG. 8 |
| 55 | Seat frame assembly | FIG. 8 |
| 60 | Main Ottoman board | FIG. 8 |
| 65 | Flipper Ottoman board | FIG. 8 |
| 70 | Front adjustable leg | FIG. 8 |
| 76 | Rear adjustable leg | FIG. 8 |
| 77 | Sloped floor | FIG. 8 |
| 100 | recline mechanism | FIG. 8 |
| 200 | Seating assembly | FIG. 8 |
| 300 | Ottoman assembly | FIG. 8 |

What is claimed is:

1. A recline mechanism for a seating assembly comprising, a pair of seat rail brackets;

a pair of front pivot links, each link of said pair of front pivot links attached to one bracket of said pair of seat rail bracket;

a pair of rear pivot upper lift link configured to control the motion of a rear end of the seating assembly wherein each link of said pair of rear pivot upper lift links is attached at its upper end to one bracket of said pair of seat rail brackets;

a pair of rear pivot links each link attached at its upper end to the lower end of one link of said pair of rear pivot upper lift links;

a pair of carrier links, each of said carrier links attached to one link of said pair of front pivot links and to the lower end of one link of said pair of rear pivot links; and a pair of rear pivot upper lift control links, each link of said rear pivot upper lift control link attached at its upper end to one link of said pair of pivot upper lift links and at its lower end to one link of said pair of carrier links.

2. The recline mechanism of claim 1, further comprising a linear actuator, a front motor drive tube, and a rear motor drive tube, wherein the front motor drive tube is attached to each of said pair of front pivot links and the back motor drive tube is attached to the pair of rear pivot links, and wherein said linear actuator is attached to said front motor drive tube by a pair of front actuator attachment points and to said rear motor drive by a pair of rear actuator attachment points.

3. A seating assembly comprising the reclining mechanism of claim 1.

4. The seating assembly of claim 3, wherein the seating assembly is a theater seat.

5. The seating assembly of claim 3, wherein the seating assembly is mounted on a sloped surface.

6. The seating assembly of claim 3, wherein the seating assembly is mounted on a flat surface.

7. The seating assembly of claim 3, further comprising a seat frame assembly attached to the seat rail bracket, a back frame assembly attached to the seat frame assembly.

8. The recline mechanism of claim 7 wherein the seat assembly further comprises an Ottoman assembly so as to provide a foot rest to the user of the seat assembly, wherein the Ottoman assembly is attached to said seat frame by links via pivotal connection points.

9. A recline mechanism for a seating assembly comprising, a pair of seat rail brackets;

a pair of front pivot links, each of said pair of front pivot links attached to one of said pair of seat rail bracket on opposite sides;

a pair of rear pivot upper lift link configured to control the motion of a rear end of the seating assembly wherein each of said pair of rear pivot upper lift links is attached at its upper end to one of said pair of seat rail brackets;

a pair of rear pivot links each attached at its upper end to the lower end of one of said pair of rear pivot upper lift links;

a pair of carrier links, each of said carrier links attached to one of said pair of front pivot links and to the lower end of one of said pair of rear pivot links; and a pair of rear pivot upper lift control links, each of said rear pivot upper lift control link attached at its upper end to one of said pivot upper lift link and at its lower end to one of said carrier link;

a linear actuator;

a front motor drive tube; and a rear motor drive tube, wherein the front motor drive tube is attached to each of said pair of front pivot links and the back motor drive tube is attached to the pair of rear pivot links, and wherein said linear actuator is attached to said front motor drive tube by a pair of front actuator attachment points and to said rear motor drive by a pair of rear actuator attachment points such that the linear actuator is configured to move at both ends.

10. A seating assembly comprising the recline mechanism of claim 9.

* * * * *